T. G. SAXTON.
FILING APPLIANCE.
APPLICATION FILED FEB. 18, 1910.
1,122,313.
Patented Dec. 29, 1914.
2 SHEETS—SHEET 1.
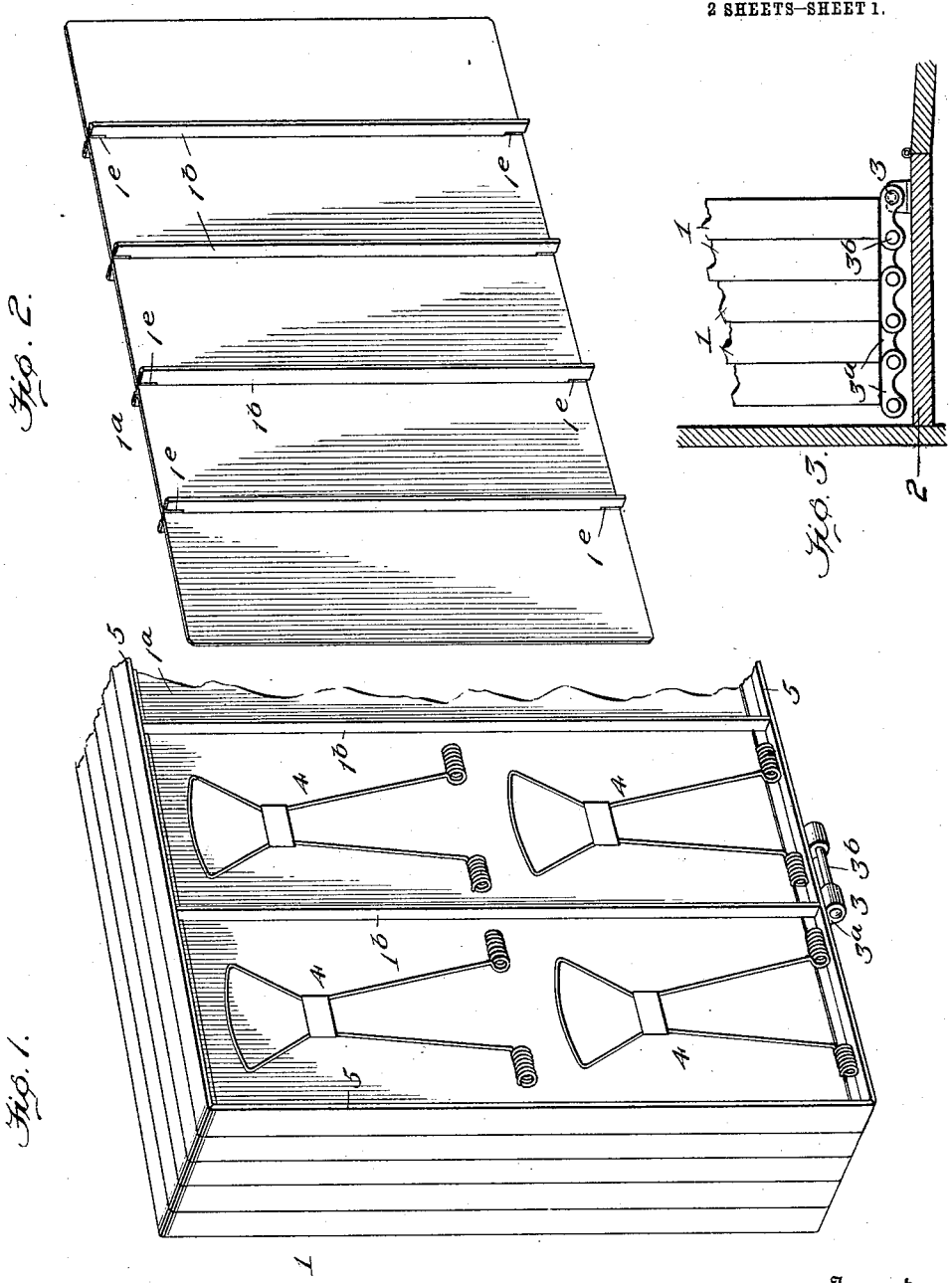
Witnesses
L. C. Brady
C. C. Wright
Inventor
Thomas G. Saxton
By Edward R. Alexander
Attorney

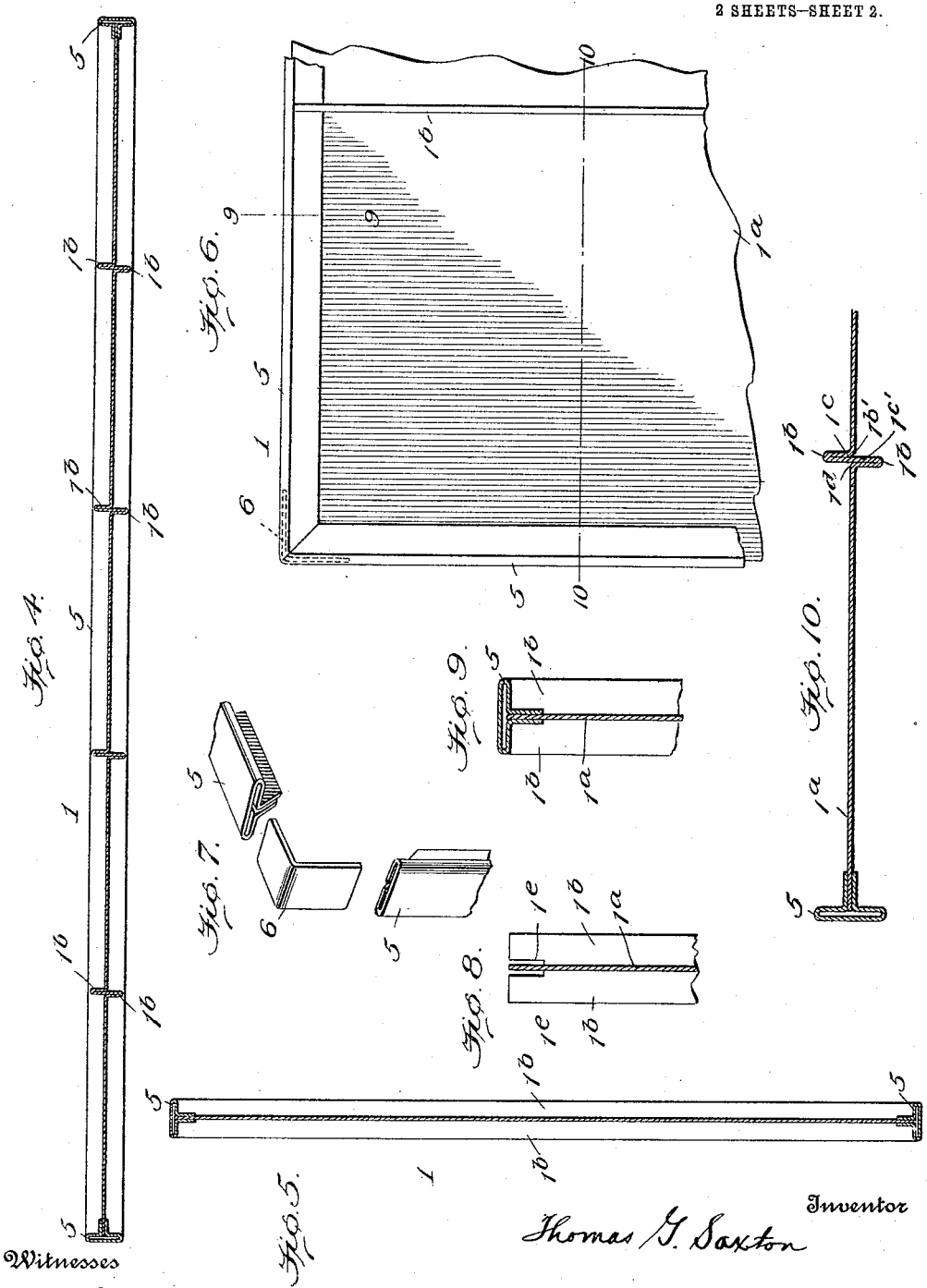

UNITED STATES PATENT OFFICE.

THOMAS G. SAXTON, OF LEXINGTON, KENTUCKY, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,122,313. Specification of Letters Patent. Patented Dec. 29, 1914.

Application filed February 18, 1910. Serial No. 544,646.

*To all whom it may concern:*

Be it known that I, THOMAS G. SAXTON, a citizen of the United States, residing at Lexington, in the county of Fayette and State of Kentucky, have invented certain new and useful Improvements in and Relating to Filing Appliances, of which the following is a specification.

This invention relates to a leaf or support against which papers, paper slips or the like, are secured.

For the purpose of illustration, I have, in the accompanying drawings, shown and herein described one form of paper support embodying my invention.

Figure 1 is a perspective view of a portion of a series of leaves embodying my invention. Fig. 2 is a perspective view of a leaf back. Fig. 3 is a side elevation of the lower portion of a series of leaves mounted upon a support. Fig. 4 is a longitudinal sectional view through one of the leaves. Fig. 5 is a transverse sectional view through one of the leaves. Fig. 6 is a front elevation of a portion of a leaf. Fig. 7 is a fragmentary sectional view of the binding members and their connector, detached. Fig. 8 is a detail view. Figs. 9 and 10 are sectional views on the line 9—9 and 10—10, respectively, of Fig. 6.

In the drawings, 1 indicates a series of leaves detachably mounted upon a suitable support 2. The support 2 preferably comprises a base forming part of a housing or casing in which the series of leaves 1 is placed for operation.

3 indicate hinging devices for the leaves whereby they may be operated from a substantially vertical to a substantially horizontal position, and vice versa, one by one, or in groups. The hinging devices 3 are preferably constructed to pivotally connect the leaves together. The hinging devices 3 may comprise bars or plates $3^a$ carried by each leaf and adapted to be connected to the bars or plates $3^a$ of adjoining leaves by pivots $3^b$.

4 indicates clamping devices carried by one or both faces of each leaf. These devices operate to secure the papers or paper slips upon the leaf and permit their ready insertion behind the device 4 and their removal therefrom, as may be desired.

Each of the leaves 1 comprises a back $1^a$ formed from sheet metal and provided with a series of spaced strips $1^b$ on one or both faces thereof. The strips $1^b$ on opposite faces of a leaf back $1^a$ are alined with each other and preferably formed integral with the back $1^a$. Each pair of alined strips $1^b$ is preferably formed by doubling the metal, from which the back is formed, intermediate its ends on itself in opposite directions into a zigzag or flattened S, as shown at $1^c$. In forming a pair of alined strips, the metallic back is bent on parallel lines $1^d$, $1^{b\prime}$, to form opposite extending lateral portions and an intermediate member $1^{c\prime}$. The laterally bent portions are then pressed together so that the opposite faces of the member $1^{c\prime}$ between the laterally bent portions lie flat against the adjacent faces thereof and in planes at right angles to the metallic back.

5 indicates hollow binding members or plates extending along the opposite edges of each leaf back $1^a$. The opposite longitudinal free ends of these plates 5 engage with the opposite faces of the back $1^a$, thus forming a binding and protecting means for the edges of the back, and also operating to strengthen the back $1^a$ longitudinally and transversely as well as to form the contacting parts between adjoining leaves 1. Each plate 5 is formed from sheet metal, preferably bent into hollow T-shape. By this construction the free ends of the plate are arranged parallel to each other and receive between them the adjacent free edge of the back $1^a$. The metal of each plate 5 is preferably slightly resilient in order that it will closely engage the opposite faces of a back $1^a$. The opposite ends of the plates 5 are preferably beveled in order to engage with correspondingly shaped ends of the adjacent plates 5.

$1^a$ indicates slots formed in the opposite ends of the strips $1^b$ and extending inwardly from their opposite ends to permit the positioning of the plates 5.

6 indicates connectors between the adjoining ends of the plates 5. Each connector 6 preferably comprises a strip of metal bent at right angles intermediate its ends and extending into the open ends of two adjoining hollow plates 5. The connector 5 is preferably of a width transversely to snugly fit within the hollow plate 5.

It will be understood that the connectors 6 operate to secure the adjoining ends of the plate 5 together and thus hold them in position upon the back 1ª; and it will also be understood that by doubling the back 1ª upon itself to form the spacing strips 1ᵇ, a very rigid leaf back is produced capable of withstanding the strains incident to supporting papers or paper slips upon its opposite faces and the operation of the leaf about its pivoting devices.

It will be noted that I have produced a leaf capable of being used in filing appliances, constructed entirely from sheet metal and the parts of which leaf are united and secured together into a light, strong, unitary and rigid structure without the use of rivets or similar devices.

To those skilled in the art of making devices of the class described, many alterations in construction and widely differing embodiments and applications of my invention will suggest themselves, without departing from the spirit and scope of the claims. My disclosures and the description herein are purely illustrative, and are not intended to be in any sense limiting.

What I claim is—

1. A leaf or support for supporting papers or paper slips, comprising a back formed from a single sheet of metal and provided with a pair of strips alined with each other upon opposite faces of the back, the said strips being formed by doubling the sheet of metal intermediate its ends laterally in opposite directions relative to the said back into a substantially zig-zag shape, a hollow binding and protecting plate extending entirely along and fitting over each edge of the back, the opposite ends of the strips being slotted to receive the free longitudinal edges of the binding and protecting plates, and connectors comprising plates bent at right angles intermediate their ends and fitting into the hollow binding plates for connecting the adjoining ends thereof together.

2. A leaf or support for supporting papers or paper slips, comprising a back formed from sheet metal and provided with a pair of strips alined with each other upon opposite faces of the back, the opposite ends of the strips having slots extending parallel to said back, a hollow binding and protecting plate extending along and fitting over each edge of the back, the opposite longitudinal edges of the corresponding binding plates extending into the slots formed in the opposite ends of said strips, and connectors, each comprising a strip of metal bent at right angles intermediate its ends and fitting into the hollow binding plates, for connecting the adjoining ends thereof together.

3. A leaf or support for supporting papers or paper slips, comprising a back formed from sheet metal and provided with a pair of strips alined with each other upon opposite faces of the back, the opposite ends of the strips having slots extending parallel to said back, a hollow binding and protecting plate extending along and fitting over each edge of the back, the opposite longitudinal edges of the corresponding binding plates extending into the slots formed in the opposite ends of said strips, and means for connecting the adjoining ends of the binding plates together.

4. A leaf or support for supporting papers or paper slips, comprising a back formed from sheet metal and provided with a pair of strips alined with each other upon opposite faces of the back, the opposite ends of the strips having slots extending parallel to said back, a hollow binding and protecting plate extending along and fitting over each edge of the back, the opposite longitudinal edges of the corresponding binding plates extending into the slots formed in the opposite ends of said strips and arranged to yieldingly engage the opposite faces of the back, and connectors, each comprising a strip of metal bent at right angles intermediate its ends and fitting into the hollow binding plates, for connecting the adjoining ends thereof together.

5. A leaf or support for supporting papers or paper slips, comprising a back formed from a single sheet of metal and provided with a pair of strips alined with each other upon opposite sides of the back, the said strips being formed by doubling the sheet of metal intermediate its ends on parallel lines laterally in opposite directions relative to the back into substantially zig-zag shape, and a T-shaped binding plate extending along each edge of the back, the stem of said T-shaped plate comprising two members disposed on opposite sides of the back, the opposite ends of the strips being slotted to receive the stem members of said T-shaped plates and their opposite end edges engaging with the upper members of the adjacent T-shaped plates to support them at right angles to said back.

In testimony whereof I affix my signature, in the presence of two witnesses.

THOMAS G. SAXTON.

Witnesses:
A. E. ANDERSON,
M. L. HOBBS.

Copies of this patent may be obtained for five cents each, by addressing the "Commissioner of Patents Washington, D. C."